(12) United States Patent
Park et al.

(10) Patent No.: US 6,291,103 B1
(45) Date of Patent: Sep. 18, 2001

(54) POSITIVE ACTIVE MATERIAL FOR RECHARGEABLE LITHIUM BATTERY

(75) Inventors: Yong-Chul Park, Chungcheongnam-do; Geun-Bae Kim; Jae-Phil Cho, both of Suwon-si; Hyun-Sook Jung, Chungcheongnam-do, all of (KR)

(73) Assignee: Samsung SDI Co., Ltd. (KR)

( * ) Notice: Subject to any disclaimer, the term of this patent is extended or adjusted under 35 U.S.C. 154(b) by 0 days.

(21) Appl. No.: 09/458,160

(22) Filed: Dec. 9, 1999

(30) Foreign Application Priority Data

Dec. 10, 1998 (KR) .................................................. 98-54089

(51) Int. Cl.$^7$ .................................................. H01M 04/58
(52) U.S. Cl. .................................. 429/231.95; 429/231.3; 429/223; 429/231.9
(58) Field of Search ..................... 429/231.3, 223, 429/231.6, 231.9, 231.95, 231.1, 218.1

(56) References Cited

U.S. PATENT DOCUMENTS 5,626,635 * 5/1997 Yamaura et al. .................... 29/623.5
6,007,947 * 12/1999 Mayer ................................. 429/231.1
6,017,654 * 1/2000 Kumta et al. ................... 429/231.95

FOREIGN PATENT DOCUMENTS 10-64549 * 3/1998 (JP) ............................... H01M/04/62

* cited by examiner

Primary Examiner—Gabrielle Brouillette
Assistant Examiner—R. Alejandro
(74) Attorney, Agent, or Firm—Blakely Sokoloff Taylor & Zafman

(57) ABSTRACT

A positive active material for a rechargeable lithium battery is provided. The positive active material is characterized by formulas 1 or 2. The positive active material exhibits good cycle life characteristics and high capacity.

$$Li_aNi_{1-(x+y+z)}Co_xM_yN_zO_b \qquad (1)$$

(where $0.95 \leq a \leq 1.05$, $0.01 \leq x+y \leq 0.5$, $0 < y \leq 0.1$, $0 \leq z \leq 0.05$, $1.7 \leq b \leq 2.3$, M is at least one metal selected from the group consisting of La and Ce, and N is at least one metal selected from the group consisting of Mg and Sr.)

$$Li_aN_bNi_{1-(x+y)}Co_xM_yO_z \qquad (2)$$

(where $0.95 \leq a+b \leq 1.05$, $0 \leq b \leq 0.5$, $0.01 \leq x+y \leq 0.5$, $<0 \leq 0.1$, $1.7 \leq z \leq 2.3$, M is at least one metal selected from the group consisting of La and Ce, and N is Mg.)

2 Claims, 4 Drawing Sheets

POSITIVE ACTIVE MATERIAL FOR RECHARGEABLE LITHIUM BATTERY

CROSS REFERENCE TO RELATED APPLICATION

This application is based on application No. 98-54089 filed in the Korean Industrial Property Office on Dec. 10, 1998, the content of which is incorporated hereinto by reference.

BACKGROUND OF THE INVENTION (a) Field of the Invention

The present invention relates to a positive active material for a rechargeable lithium battery and, more particularly, to a positive active material for a rechargeable lithium battery which exhibits high capacity and good cycle life characteristics.

(b) Description of the Related Art

Rechargeable lithium batteries are generally used in cellular phones, camcorders or notebook personal computers. The cycle life characteristics are critical for the rechargeable lithium batteries, which depend on capacity of the batteries. Because the capacity of the batteries depends on positive active materials, there have been attempted to development of positive active materials exhibiting high capacity.

Manganese-based active material such as $LiMn_2O_4$ or $LiMnO_2$, or cobalt-based active materials have introduced as a positive active material exhibiting high capacity for the early. The active materials, however, exhibit low capacity such as 120 mAh/g or 160 mAh/g at 4.3 V charge and discharge, respectively. Recently, an attempt has been to develop nickel-based positive active materials with 20% higher discharge capacity than the manganese- or cobalt-based positive active materials.

$LiNiO_2$ which is employed for the nickel-based positive active material, exhibits high capacity, about 203mAh/g of initial discharge capacity at 0.1 C discharge based on 4.3 V charge and about 180 mAh/g thereof at 1 C. $LiNiO_2$, however, shows undesirable cycle life characteristics due to the change from monoclinic structure to hexagonal structure. This problem is addressed by adding cobalt to $LiNiO_2$, but the amount of cobalt should be more than 30 mole % of total transition metal, which causes the capacity loss.

SUMMARY OF THE INVENTION

It is an object of the present invention to provide a positive active material for a rechargeable lithium battery which has a stable structure and exhibits good cycle life characteristics and high capacity.

These and other objects may be achieved by a positive active material for a rechargeable lithium battery represented by the formula 1 or 2.

(where $0.95 \leq a \leq 1.05$, $0.01 \leq x+y \leq 0.5$, $0 < y \leq 0.1$, $0 \leq z \leq 0.05$, $1.7 \leq b \leq 2.3$, M is at least one metal selected from La or Ce, and N is at least one metal selected from Mg or Sr.)

(where $0.95 \leq a+b \leq 1.05$, $0 \leq b \leq 0.05$, $0.01 \leq x+y \leq 0.5$, $0 < y \leq 0.1$, $1.7 \leq z \leq 2.3$, M is at least one metal selected from La or Ce, and N is Mg.)

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1:
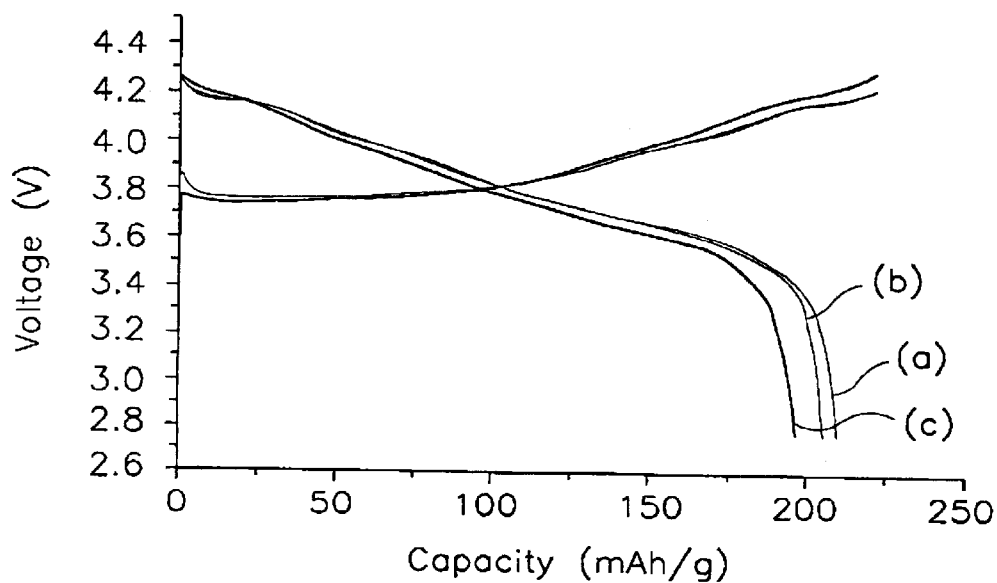
FIG. 1 is a graph illustrating initial capacity of cells according to Examples 1 and 3, and Comparative example 1 of the present invention.

The present invention provides a positive active material, which exhibits reduced irreversible capacity, high capacity and good cycle life characteristics, owing to La or Ce added to an active component. The desirable battery performance characteristics such as reduced irreversible capacity, high capacity and good cycle life, can be more improved by further adding Sr or Mg to the active component. The active component refers to lithium nickel cobalt oxides.

The decreases in the irreversible capacity by Mg is less than that by La, Ce and Sr, but the increases in the cycle life by Mg is almost identical to that by La, Ce and Sr. It is considered that Mg is chemically inserted into a structure of the active component and makes an unstable active component's structure change to stable structure. This results in the improved cycle life characteristics.

The other additive material, La, Ce or Sr has 20% larger ion diameter than Ni, which does not allow it to chemically insert into the active component and makes it physically co-precipitate with the active component. La, Ce, or Sr is transferred beneath the surface of the active component by a subsequent sintering step and thus large amounts of La, Ce or Sr come to be present beneath the surface of the active component. The additive material, La, Ce or Sr prevents the direct contact between the active component and an electrolyte, resulting in the improvement of cycle life characteristics.

Based on these reasons, the suitable combination of La, Ce, Sr or Mg is able to provide a positive active material having good cycle life characteristics and high capacity.

For producing the positive active material of the present invention, a nickel cobalt hydroxide powder co-precipitated with metals such as La, Ce or a mixture thereof is preferably used for a starting material. The metal-coprecipitaed nickel cobalt hydroxide has a globular or a pseudolobular shape. More preferably, in addition to La, Ce or a mixture thereof, Mg, Se or a mixture thereof is further added with nickel cobalt hydroxide powder. The metal-coprecipitated nickel cobalt hydroxide powder is mixed with a lithium salt and the mixture is sintered twice to obtain an active material which maintains a structure of nickel cobalt hydroxide at about 750° C. The lithium salt may be lithium nitrate, lithium sulfate, lithium hydroxide, lithium carbonate or lithium organic salts such as lithium acetate or lithium oxalate.

A method of preparing the metal-coprecipitated nickel cobalt hydroxide will be illustrated in more detail.

A metal solution is prepared. The metal solution includes a nickel salt, a cobalt salt, a metal selected from La, Ce or a mixture thereof. Preferably, the metal solution further includes a magnesium salt or a strontium salt. At this time, the concentration of the total metal in the metal solution is preferably about 2.5M. A solvent may be water. The nickel salt may be nickel nitrate, nickel hydroxide or nickel acetate and the cobalt salt may be cobalt nitrate, cobalt hydroxide or cobalt carbonate. The lanthanum salt may be lanthanum hydroxide, lanthanum nitrate or lanthanum sulfate, and the cerium salt may be cerium hydroxide, cerium nitrate or cerium sulfate. The magnesium salt may be magnesium hydroxide, magnesium nitrate or magnesium sulfate and the strontium salt may be strontium hydroxide, strontium nitrate or strontium sulfate.

The metal solution, $NH_4OH$ as a complexing agent, NaOH as a precipitating agent are injected into a reactor. The temperature of the reactor preferably keeps at about 50° C. and pH of the reactor preferably keeps 11 to 12. The mole ratio of metal: $NH_4OH$ is preferably 1: 0.4 to 1. The reaction is preferably performed by mixing the materials in the reactor at a rate of about 900 rpm. The overflowed reactant, reacting precipitate is washed with water or a weak acid until the reactant reaches neutrality and dried to produce a nickel cobalt hydroxide powder co-precipitated with a metal. The metal is selected from La, Ce or a mixture, preferably, and Mg or Sr and having a globular or a pseudo-globular shape. In the nickel cobalt hydroxide powder, Mg is inserted into a structure of nickel cobalt hydroxide such that the stable active material can be provided. The other metal ions having 20% larger ion diameter than Ni is co-precipitated with nickel cobalt hydroxide rather than inserted into that.

The metal-coprecipitated nickel cobalt hydroxide has an average diameter of 1 to 30 $\mu$m and a tapping density of 2.4 to 3.0 g/cc. The nickel cobalt hydroxide has a globular or a pseudo-globular shape.

The metal-coprecipitated nickel cobalt hydroxide is mixed with a lithium salt such as lithium hydroxide. The mixture is sintered at 400 to 500° C. and the sintered material is again sintered at 650 to 750° C. to obtain an active material. At this time, metals, such as La, Ce or Sr are transferred onto a surface of the active component, nickel cobalt hydroxide. It seems that the active material includes a core derived from nickel cobalt hydroxide and a metal shell formed on the core. The resulting active material has a globular or a pseudo-globular shape, 1 to 30 $\mu$m of an average diameter and 2.4 to 3.0 g/cc of a tapping density. The nickel cobalt hydroxide is characterized by the formulas 1 or 2.

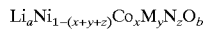

$$Li_aNi_{1-(x+y+z)}Co_xM_yN_zO_b \quad (1)$$

(where $0.95 \leq a \leq 1.05$, $0.01 \leq x+y \leq 0.5$, $0 y<0.1$, $0 \leq z \leq 0.05$, $1.7 \leq b \leq 2.3$, M is at least one metal selected from La or Ce, and N is at least one metal selected from Mg or Sr.)

$$Li_aN_bNi_{1-(x+y)}Co_xM_yO_z \quad (2)$$

(where $0.95 \leq a+b \leq 1.05$, $0 \leq b \leq 0.05$, $0.01 \leq x+y \leq 0.5$, $0<y \leq 0.1$, $1.7 \leq z \leq 2.3$, M is at least one selected from La or Ce, and N is Mg.)

Alternatively, instead of the above methods using two steps of preparing the metal-coprecipitated nickel cobalt hydroxide and mixing the resulting nickel cobalt hydroxide with lithium salts, one step may be used for the presentive positive active material.

For example, nickel cobalt hydroxide, a metal salt selected from La, Ce or a mixture and a lithium salt are mixed and two sintering steps are performed. In the mixing step, a magnesium salt or strontium salt is further added into the mixture.

The artisan in the related art will readily manufacture rechargeable lithium batteries with the positive active materials by the conventional process. In the rechargeable lithium batteries, carbonaceous materials such as lithium metal, lithium alloy, graphite from or into which lithium ions are deintercalated or intercalated, or carbon is used for a negative active material For an electrolyte, non-aqueous liquid electrolyte or polymer electrolyte is used.

The following examples further illustrate the present invention.

EXAMPLE 1

$Ni(NO_3)_2$, $Co(NO_3)_2$, $La(NO_3)_3$ and $Mg(NO_3)_2$ were dissolved in water to prepare a 2.5M metal solution. The metal solution, $NH_4OH$ as a complexing agent and NaOH as a precipitating agent were continuously injected into a reactor keeping 50° C. and which is capable of overflowing at a constant rate. At this time, the mole ratio of metal: metal in the metal solution was 1:0.5. The pH of the reactor kept 11.5 and the materials in the reactor was shaken at a rate of 900 rpm to react. The overflowed reacting precipitates were washed with water under the reactant reached neutrality and dried. As a result, a $Ni_{0.88}Co_{0.1}Mg_{0.01}La_{0.01}(OH)_{2.01}$ powder having an average diameter of 1 to 30 $\mu$m and a globular shape.

The $Ni_{0.88}Co_{0.1}Mg_{0.01}La_{0.01}(OH)_{2.0}$ powder was mixed with LiOH at a desirable mole ratio. The mixture was then sintered at 450° C. for 6 hours and the sintered material was again sintered at 700° C. for 15 hours. The second sintered material was cooled to room temperature to produce a $LiNi_{0.88}Co_{0.1}Mg_{0.01}La_{0.01}O_2$ active material having a diameter of 1 to 30 $\mu$M and a tapping density of 2.4 to 3.0 g/cc.

An X-ray diffraction of the active material powder was measured and the result was identical to a 9-0063 pattern of JCPDS (Joint Committee on Powder Diffraction Standards) and exhibited the resembled layered structure thereof.

EXAMPLE 2

A $Ni_{0.88}Co_{0.1}(OH)_{1.96}$ powder was prepared by the same corecipitation method in Example 1. The $Nio._{0.88}Co_{0.1}(OH)_{1.96}$ powder, $La(OH)_3$ and LiOH were mixed in a desirable mole ratio. The mixture was sintered at 450° C. for 6 hours and the sintered material was again sintered at 700° C. for 15 hours. The second sintered material was cooled to room temperature to obtain a $LiNi_{0.88}Co_{0.1}La_{0.02}O_2$ active material. The active material had a diameter of 1 to 30 $\mu$m and a tapping density of 2.4 to 3.0 g/cc.

An X-ray diffraction of the active material powder was measured and the result was identical to a 9-0063 pattern of JCPDS (Joint Committee on Powder Diffraction Standards) and exhibited the resembled layered structure thereof.

EXAMPLE 3

A $Ni_{0.88}Co_{0.1}La_{0.01}(OH)_{1.99}$ powder was prepared by the same co-precipitation method in Example 1. The $Ni_{0.88}Co_{0.1}$ $Mg_{0.01}(OH)_{1.99}$ powder, $Mg(OH)_2$ and LiOH were mixed in a desirable mole ratio. The mixture was sintered at 450° C. For 6 hours and the sintered material was again sintered at 700° C. For 15 hours. The second sintered material was cooled to room temperature to produce a $LiNi_{0.88}Co_{0.1}Mg_{0.01}O_2$ active material powder.

EXAMPLE 4

A $Ni_{0.88}Co_{0.1}Mg_{0.01}(OH)_{1.98}$ powder was prepared by the same co-precipitation method in Example 1. The $Ni_{0.88}Co_{0.1}Mg_{0.01}(OH)_{1.98}$ powder, $La(OH)_3$ and LIOH were mixed in a desirable mole ratio and sintered at 450° C. For 6 hours. The sintered material was again sintered at 700° C. For 15 hours and cooled to room temperature to produce a $LiNi_{0.88}Co_{0.1}La_{0.01}Mg_{0.01}O_2$ active material powder.

EXAMPLE 5

A $Ni_{0.8975}Co_{0.1}La_{0.0025}(OH)_{2.0025}$ powder was prepared by the same procedure in Example 1. The $Ni_{0.8975}Co_{0.1}La_{0.00025}(OH)_{2.0025}$ powder was mixed with LiOH in a desirable mole ratio and the mixture was sintered at 450° C. For 6 hours. The sintered material was again sintered at 700° C. For 15 hours and cooled to room temperature to produce a $LiNi_{0.8975}Co_{0.1}La_{0.0025}O_2$ active material powder.

EXAMPLE 6

A $Ni_{0.895}Co_{0.1}La_{0.005}(OH)_{2005}$ powder was prepared by the same procedure in Example 1. The $Ni_{0.895}Co_{0.1}La_{0.005}(OH)_{2.005}$ powder was mixed with LiOH in a desirable mole ratio and the mixture was sintered at 450° C. For 6 hours. The sintered material was again sintered at 700° C. For 15 hours and cooled to room temperature to produce a $LiNi_{0.895}Co_{0.1}La_{0.0005}O_2$ active material powder.

EXAMPLE 7

A $Ni_{0.89}CO_{0.1}La_{0.01}(OH)_{2.01}$ powder was prepared by the same procedure in Example 1. The $Ni_{0.89}Co_{0.1}La_{0.01}(OH)_{2.01}$ powder was mixed with LiOH in a desirable mole ratio and the mixture was sintered at 450° C. For 6 hours. The sintered material was again sintered at 700° C. For 15 hours and cooled to room temperature to produce a $LiNi_{0.89}Co_0La_{0.01}O_2$ active material powder.

EXAMPLE 8

A $Ni_{0.88}Co_{0.1}Ce_{0.02}(OH)_2$ powder was prepared by the same procedure in Example 1. The $Ni_{0.88}Co_{0.1}Ce_{0.02}(OH)_2$ powder was mixed with LiOH in a desirable mole ratio and the mixture was sintered at 450° C. For 6 hours. The sintered material was again sintered at 700° C. For 15 hours and cooled to room temperature to produce a $LiNi_{0.88}Co_{0.1}Ce_{0.02}O_2$ active material powder.

EXAMPLE 9

A $Ni(NO_3)_2$, $Co(NO_3)_2$, $Ce(NO_3)_3$, $Sr(NO_3)_2$ were dissolved in water to prepare a 2.5M metal solution. The metal solution, $NH_4OH$ as a complexing agent and NaOH as a precipitating agent were continuously injected into a reactor keeping 50° C. and which is capable of overflowing at a constant rate. At this time, the mole ratio of metal:$NH_4OH$ in the metal solution was 1:0.5.

The pH of the reactor kept 11.5 and the materials in the reactor was shaken at a rate of 900 rpm to react. The overflowed reacting precipitates were washed with water under the reactant reached neutrality and dried. As a result, a $Ni_{0.88}Co_{0.1}Ce_{0.01}Sr_{0.01}(OH)_{2.01}$ powder having an average diameter of 1 to 30 $\mu$m and a globular shape.

The $Ni_{0.88}Co_{0.1}Ce_{0.1}Sr_{0.01}(OH)_{2.01}$ powder was mixed with LiOH at a desirable mole ratio. The mixture was then sintered at 450° C. For 6 hours and the sintered material was again sintered at 700° C. For 15 hours. The second sintered material was cooled to room temperature to produce a $LiNi_{0.88}Co_{0.1}Ce_{0.01}Sr_{0.01}O_2$ active material having a diameter of 1 to 30 $\mu$m and a tapping density of 2.4 to 3.0 g/cc.

EXAMPLE 10

A $Ni_{0.89}Co_{0.1}Ce_{0.01}(OH)_2$ powder was prepared by the same co-precipitation method in Example 1.

The $Ni_{0.89}Co_{0.1}Ce_{0.01}(OH)_2$ powder and LIOH were mixed in a desirable mole ratio. The mixture was then sintered at 450° C. For 6 hours and the sintered material was again sintered at 700° C. For 15 hours. The second sintered material was cooled to room temperature to produce a $LiNi_{0.089}Co_{0.1}Ce_{0.01}O_2$ active material.

EXAMPLE 11

A $Ni_{0.88}Co_{0.1}Ce_{0.02}(OH)_{2.02}$ powder was prepared by the same co-precipitation method in Example 1.

The $Ni_{0.88}Co_{0.1}Ce_{0.02}(OH)_{202}$ powder, UOH, $Mg(OH)_2$ were mixed in a desirable mole ratio. The mixture was then sintered at 450° C. For 6 hours and the sintered material was again sintered at 700° C. For 15 hours. The second sintered material was cooled to room temperature to produce a $LiNi_{0.88}Co_{0.1}Ce_{0.01}Mg_{0.01}O_2$ active material having a diameter of 1 to 30 $\mu$m and a tapping density of 2.4 to 3.0 g/cc.

Comparative Example 1

$Ni(OH)_2$, $Co(OH)_2$ and $UOH-H_2O$ were mixed in a mole ratio of 0.9: 0.1: 1 The mixture was sintered at 750 to 800° C. under an oxygen atmosphere to produce a $LiNi_{0.9}Co_{0.1}O_2$ active material powder. An X-ray diffraction of the active material powder was measured. The result is that the active material powder has a layered structure and shapeless. The active material had about 5 $\mu$m of diameter and 2 g/cc of a tapping density.

Each of the active materials according to Examples 1 to 8 and Comparative example 1, a polyvinylidene fluoride binder and a carbon black conducting agent were mixed in the weight ratio of 92: 4: 4. N-methyl pyrrolidone was admixed to the mixture to make a paste. The paste was coated on an aluminum foil with a thickness of 300 microns using a doctor blade. The coated foil was dried at 150° C. to evaporate N-methyl pyrrolidone and pressed to produce a positive electrode. The positive electrode was cut into a circle form and welded to a coin cell-type can. Metallic lithium foil was cut into the same with the positive electrode and attached to a nickel foil. A separator commercially available from Celgard Co., Ltd. was used and an electrolyte including $LiPF_6$ dissolved in ethylene carbonate and dimethyl carbonate was used. Using the positive electrode, metallic lithium for a reference electrode, separator and electrolyte, a coin type half-cell was manufactured.

After charging and discharging the cells according to Examples 1 and 3, and Comparative example 1 at 0.1 C, initial discharge capacities were measured. The results are presented in FIG. 1. As shown in FIG. 1, initial discharge capacity of Comparative example 1 (c) was only 197 mAh/g, but that of Example 1 (a) was 210 mAh/g and that of Example 3 (b) was 207 mAh/g. The cells of Examples 1 and 3 has excellent the initial discharge capacity than that of Comparative Example 1.

Figure 2:
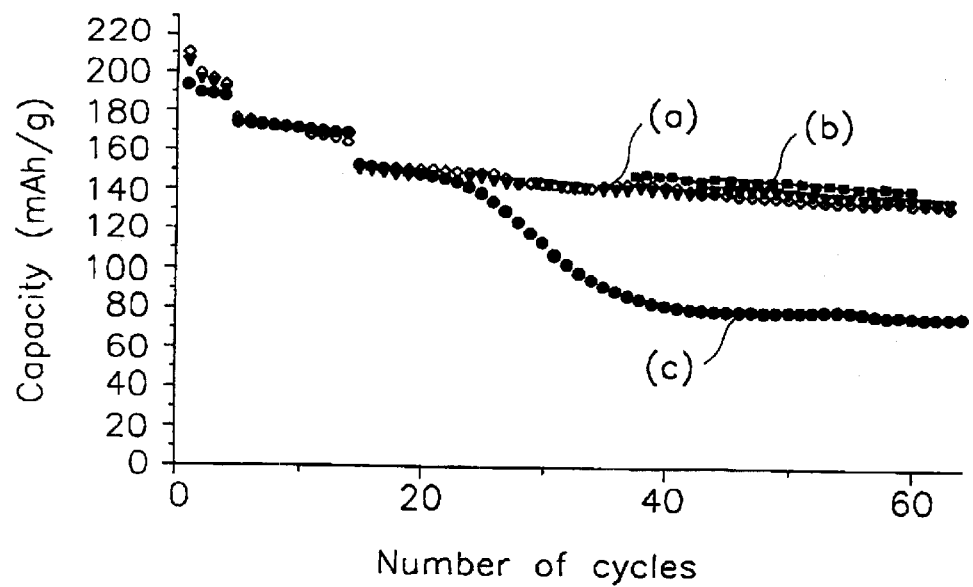
FIG. 2 is a graph illustrating cycle life of cells according to Examples 1 and 3, and Comparative example 1 of the present invention.

The cycle life characteristics of cells according to Examples 1 and 3, and Comparative example 1 are shown in FIG. 2. As shown in FIG. 2, the cells of Examples 1 and 3 have improved cycle life characteristics than that of Comparative example 1. The capacity percent after 50 cycles at 1C charge and discharge was 91% in Example 1 (a), 90% in Example 3 (b) and about 60% in Comparative example 1 (c). The capacity percent is indicated by percent values which making the initial capacity to be one hundred percent.

Figure 3:
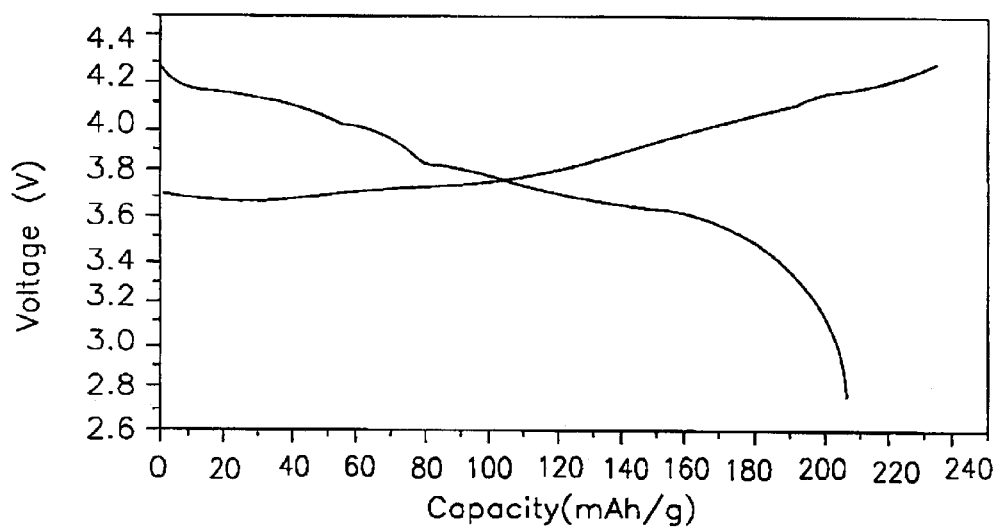
FIG. 3 is a graph illustrating initial capacity of cell according to Example 10 of the present invention.
Figure 4:
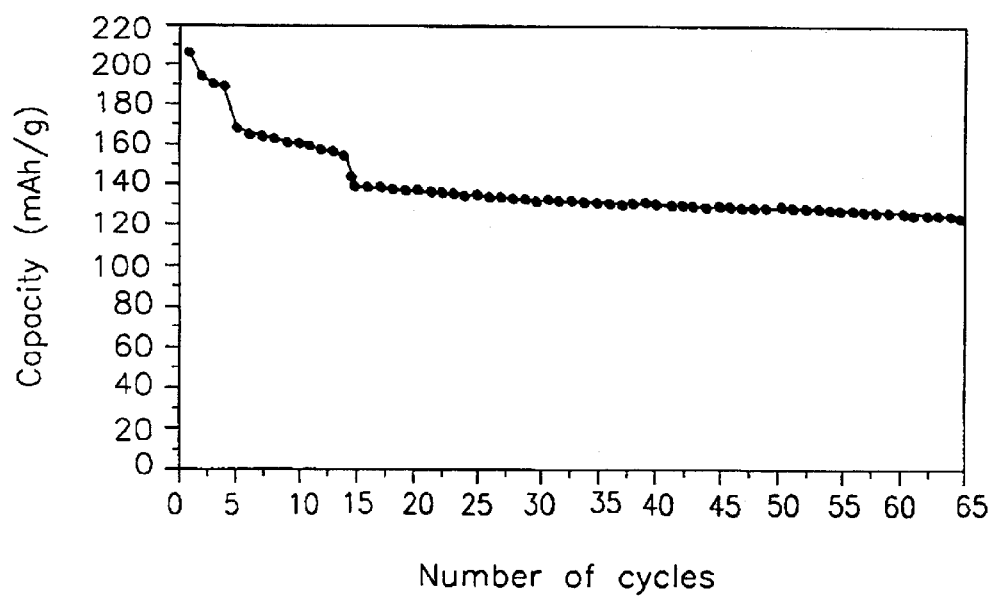
FIG. 4 is a graph illustrating cycle life of cell according to Example 10 of the present invention.

The cell according to Example 8 was charged and discharged at 0.1 C and the initial discharge capacity was measured. The result is shown in FIG. 3. As shown in FIG. 3, the initial discharge capacity of Example 8 was about 209 mAh/g. Furthermore, the cycle life characteristic of the cell according to Example 8 is shown in FIG. 4. When compared FIG. 4 with FIG. 2, the cell of Example 8 is less capacity loss as repeated charge and discharge than Comparative example 1.

Figure 5:
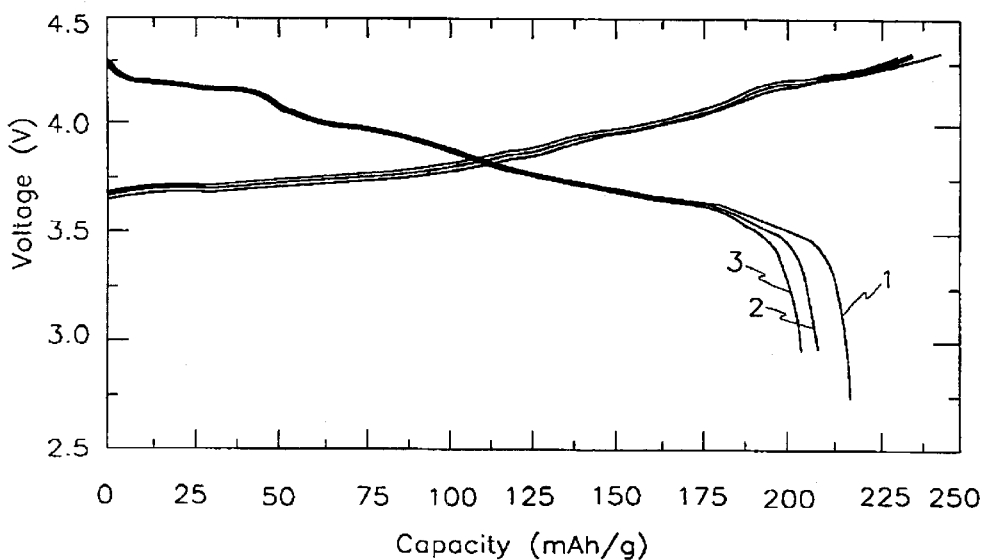
FIG. 5 is a graph illustrating the changes of initial capacity according to composition in the positive active material of the present invention.

The cells according to Examples 5 to 7 were charged and discharged and initial discharge capacities were measured. The results are shown in FIG. 5. In FIG. 5, number 1 indicates Example 5, number 2 indicates Example 6, and number 3 indicates Example 7. As shown in FIG. 5, initial discharge capacity depended on the amount of lanthanum in the active material. The cell of Example 5 using the $LiNi_{0.8975}Co_{0.1}La_{0.0025}O_2$ active material had excellent initial discharge capacity. The cell of Example 7 using the $LiNi_{0.89}Co_{0.1}La_{0.01}O_2$ active material had relatively low initial discharge capacity than the other cells using the other active material.

Figure 6:
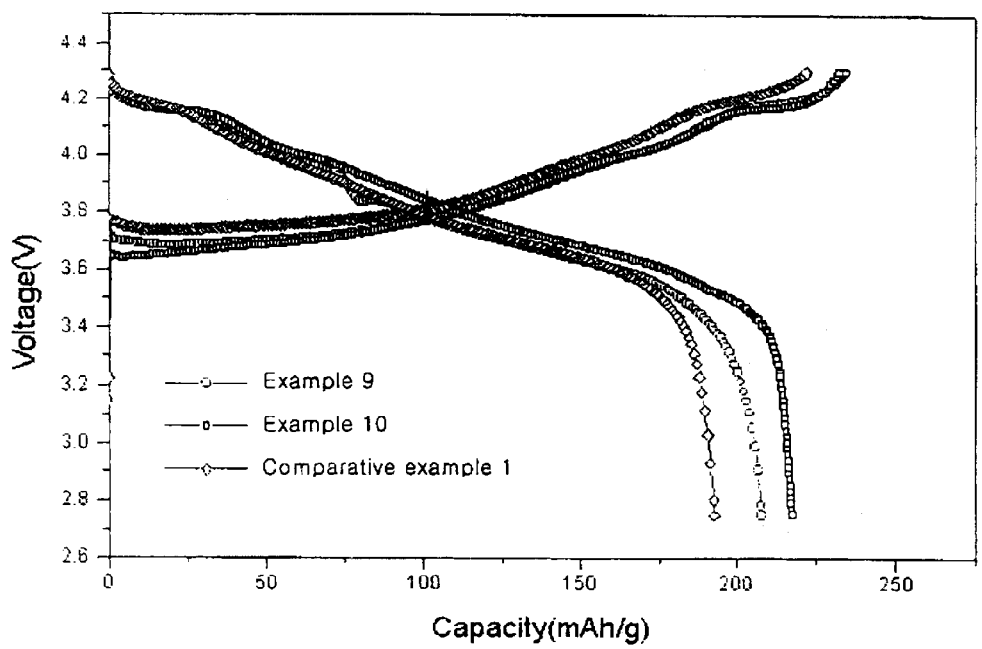
FIG. 6 is a graph illustrating the initial capacity of cells according to Examples 9 and 10. and Comparative example 1 of the present invention.
Figure 7:
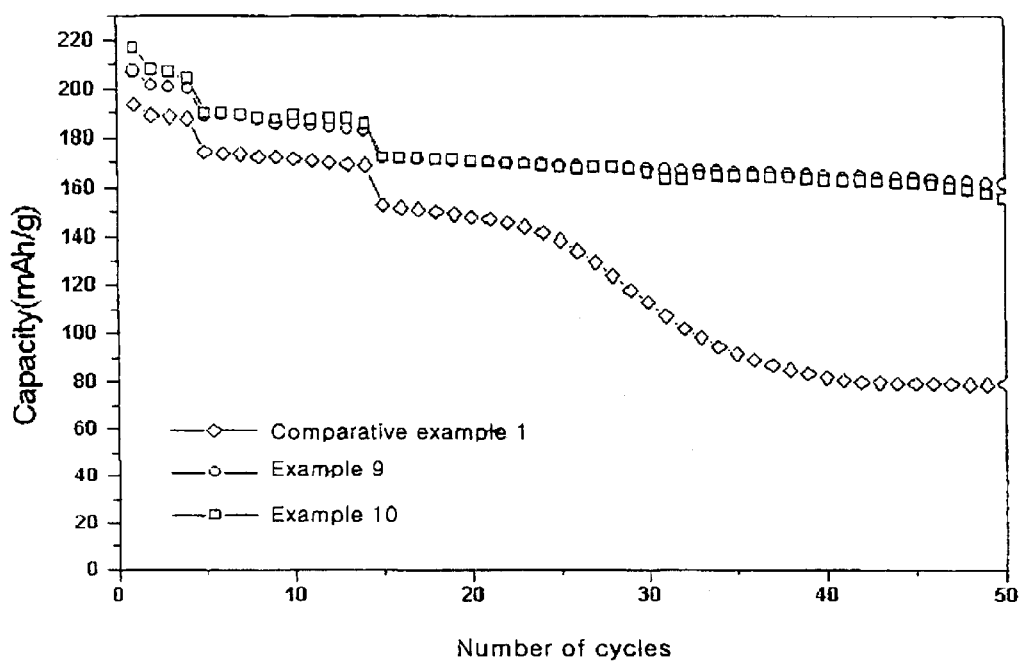
FIG. 7 is a graph illustrating the cycle life of cells according to Example 9 and 10, and Comparative example 1 of the present invention.

The initial capacity of cells according to Examples 9 and 10, and Comparative example 1 were measured and the results are shown in FIG. 6. As shown in FIG. 6, Examples 9 and 10 show good initial capacity than Comparative example 1. Furthermore, the cycle life characteristics of the cells according to Examples 9 and 10, and Comparative example 1 are shown in FIG. 7. The cells of Examples 9 and 10 are less capacity loss as repeated charge and discharge than Comparative example 1.

The positive active material of the present invention exhibits high capacity of about 210 mAh/g or more (0.1 C discharge) and good cycle life characteristics While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery represented by the formula

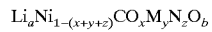

where $0.95 \leq a \leq 1.05$, $0.01 \leq x+y \leq 0.5$, $0 \leq y \leq 0.1$, $0 \leq z \leq 0.05$, $1.7 \leq b \leq 2.3$, M is at least one metal selected from the group consisting of La aid Ce, and N is at least one metal selected from the group consisting of Mg and Sr.

2. The positive active material of claim 1 wherein the positive active material has a globular or a pseudolobular shape, an average diameter of 1 to 30 μm and a tapping density of 2.3 to 3.0 g/cc.

* * * * *